United States Patent
Demele et al.

(10) Patent No.: US 10,417,649 B2
(45) Date of Patent: Sep. 17, 2019

(54) BUSINESS PROCESS GLOBAL SEARCHING

(71) Applicant: ORACLE INTERNATIONAL CORPORATION, Redwood Shores, CA (US)

(72) Inventors: Michael Demele, Los Altos, CA (US); David J. Bell, Folsom, CA (US); Jillian Hartnell, Granite Bay, CA (US); Therese Gorman, Rio Rancho, NM (US); Thomas Workman, Layton, UT (US); Tamijselvy Muralidharan, Cupertino, CA (US); Cyril Jose Theophilose Ponvila, Bangalore (IN); Hsiaowen Eddie Mou, Brentwood, CA (US); Umesh Madhav Apte, San Ramon, CA (US); John Leong Yee, San Mateo, CA (US); Jose Hernandez, Hayward, CA (US); Hui Dong, Richmond (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 792 days.

(21) Appl. No.: 14/037,851

(22) Filed: Sep. 26, 2013

(65) Prior Publication Data
US 2014/0095253 A1    Apr. 3, 2014

Related U.S. Application Data

(60) Provisional application No. 61/707,184, filed on Sep. 28, 2012.

(51) Int. Cl.
*G06Q 30/02* (2012.01)
*G06Q 10/10* (2012.01)

(52) U.S. Cl.
CPC ......... *G06Q 30/0201* (2013.01); *G06Q 10/10* (2013.01)

(58) Field of Classification Search
CPC ..... G06Q 30/0201; G06Q 10/10; G06F 17/30
(Continued)

(56) References Cited

U.S. PATENT DOCUMENTS 6,407,761 B1    6/2001  Ching et al.
6,401,091 B1 *  6/2002  Butler ............... G06F 17/30997
(Continued)

FOREIGN PATENT DOCUMENTS

EP    2270724 A2    1/2011

OTHER PUBLICATIONS

Mukherjee et al., Enterprise Search: Tough Stuff. Queue—Search Engines. vol. 2 Issue 2, Apr. 2004. (Year: 2004).*
(Continued)

*Primary Examiner* — Deirdre D Hatcher
*Assistant Examiner* — Alissa D Karmis
(74) *Attorney, Agent, or Firm* — Kilpatrick Townsend & Stockton, LLP

(57) ABSTRACT

Embodiments of the invention provide for performing a search across business objects of one or more business processes. More specifically, embodiments of the present invention provide for performing a search across business objects of one or more business processes based on an index of business objects and additional information supplementing the index. The additional information can indicate business objects of different types or of different business processes that are related to the indexed business objects. According to various embodiments of the present invention, providing business object and business process searching can include but is not limited to: the ability to more quickly find related documents using search in one step; the ability (Continued)

to do so without using menus; the ability to quickly refine search results with common facets; and/or the ability to do advanced common attributes searches across business objects such as comments for a supplier across numerous business objects.

15 Claims, 11 Drawing Sheets

(58) Field of Classification Search
USPC .......................... 705/7.29; 707/741, 999.001
See application file for complete search history.

(56) References Cited

U.S. PATENT DOCUMENTS

| | | | |
|---|---|---|---|
| 6,609,123 B1* | 8/2003 | Cazemier | G06F 17/30607 |
| 7,567,953 B2* | 7/2009 | Kadayam | G06F 17/30864 |
| 2004/0083213 A1* | 4/2004 | Wu | G06F 17/3064 |
| 2004/0162816 A1* | 8/2004 | Irle | G06F 17/30286 |
| 2005/0198000 A1 | 9/2005 | Rapp | |
| 2006/0026145 A1* | 2/2006 | Beringer | G06F 3/0482 |
| 2006/0149712 A1* | 7/2006 | Kindsvogel | G06F 17/30312 |
| 2006/0179036 A1* | 8/2006 | Broker | G06F 17/30991 |
| 2006/0282427 A1* | 12/2006 | Shurtleff | G06F 17/30967 |
| 2007/0100868 A1* | 5/2007 | Hackmann | G06F 16/252 |
| 2007/0168335 A1* | 7/2007 | Moore | G06F 17/30864 |
| 2008/0052274 A1* | 2/2008 | Moore | G06F 17/30607 |
| 2009/0006330 A1* | 1/2009 | Pandey | H04L 63/08 |
| 2009/0125531 A1* | 5/2009 | Scheerer | G06Q 10/06 |
| 2009/0132494 A1* | 5/2009 | Gutlapalli | G06F 17/30011 |
| 2010/0057679 A1 | 3/2010 | King et al. | |
| 2010/0070496 A1* | 3/2010 | Ghosh | G06F 17/30 707/736 |
| 2010/0115457 A1* | 5/2010 | Bombolowsky | G06F 3/0481 715/782 |
| 2011/0087689 A1* | 4/2011 | Ziegler | G06Q 10/10 707/769 |
| 2011/0246444 A1* | 10/2011 | Jenkins | G06F 9/4443 707/711 |
| 2012/0109661 A1* | 5/2012 | Lueckhoff | G06Q 10/10 705/1.1 |
| 2013/0159060 A1* | 6/2013 | Steinbach | G06Q 10/06 705/7.36 |
| 2013/0166573 A1* | 6/2013 | Vaitheeswaran | G06F 17/30389 707/749 |

OTHER PUBLICATIONS

"Drive Sales with Faceted Searching" posted Oct. 3, 2012 by milanie, [accessed on Jul. 17, 2017] 2 pages. Accessed from: http://blog.upshotcommerce.com/drive-sales-with-faceted-searching/.

"Architect and Develop Search-Enabled Enterprise Applications" by Beat Schwegler, Oct. 2007 [accessed on Jul. 17, 2017 ] 14 pages. Accessed from https://msdn.microsoft.com/en-us/library/bb887531.aspx.

"Oracle Secure Enterprise Search 11g, Version 11.1.2.2", released Apr. 16, 2011 [accessed on Jul. 17, 2017] 12 pages. Accessed from http://www.oracle.com/technetwork/search/oses/overview/ses-datasheet-11-129111.pdf.

"Keyword Search" [Accessed Nov. 14, 2012] 2 pages. Accessed from: http://help.sap.com/saphelp_erp60_sp/helpdata/en/43/2fe3b4c0750b18e10000000a1553f6/content.htm.

"Quick Search in abas Business Software" [accesses Nov. 14, 2012] 1 page. Accessed from http://www.abas-software.com/en/aktuelles/09/suchmaschine.htm.

* cited by examiner

| ORACLE | Procure to Pay ▾ | Wireless Compact Keyboard | ⊗ Advanced Search | 🔍 Last Search Results | Home |

Favorites ▸ | Main Menu ▸

Search Results for "Wireless Compact Keyboard"    850

Filter by 21  results matched your search criteria    ◂ 1 2 3 ▸

Category
Purchase Orders (15)
Purchase Requisitions (2)
Sourcing Events (2)
Vouchers (1)
Receipts(1)

Vouchers – US001 | V10000 ⎯⎯ 825
Last Updated Date: 2012-02-08
Vendor: Midtown Computer Supplies | Date 2012-02-08 | Style: Regular Voucher | Amount: 10000 USD | Entered By: DVPI | Invoice ID: INVr10000 | Entry Status: Postable | Source: Online
▸ Related Actions PO – US001 | P10000 ⎯⎯ 830
Last Updated Date: 2012-02-06

Business Unit/SetID
BU-US001 (21)

Vendor: Midtown Computer Supplies | Date 2012-02-06 | Status: Dispatched | Amount: 10000 USD | Buyer: Chris Baker | PO Reference: | Hold From Processing: N
▸ Related Actions

Document Date
2009 (11)
2008 (6)
2012 (4)

REQ – US001 | Q10000 ⎯⎯ 855
Last Updated Date: 2012-02-06
Date: 2012-02-06 | Status: Approved | Amount: 10000 USD | Entered By: DVP1 | Requisition Name: Q10000 | Requester: Kenneth Schumacher
▸ Related Actions

Name 1
Midtown Computer Supplies (20)
East Bay Office Supplies (3)
CompUSA (2)
Office Depot Inc (2)

PO – US001 | 0000000223
Last Updated Date: 2009-08-17
Vendor: Midtown Computer Supplies | Date 2009-08-17 | Status: Dispatched | Amount: 11395 2 USD | Buyer: Calvin Roth | PO Reference | Hold From Processing: N
▸ Related Actions PO – US001 | 0000000222
Last Updated Date: 2009-07-16
Vendor: East Bay Office Supplies | Date 2009-07-16 | Status: Dispatched | Amount: 116865 USD | Buyer: Calvin Roth | PO Reference | Hold From Processing: N
▸ Related Actions

Entered By
CROTH (17)
DVP 1 (4)

Event – US001 | COMPUTERS | 1 1
Last Updated Date: 2009-07-13
Status: Awarded | Amount: 2060000 USD | Entered By: CROTH | Format: Buy | Type: RFx | Name: Computer

ORACLE | Catalog Items ▷ | color printer paper | ⊗ Advanced Search | 🚚 Last Search Results | Home | Worklist Favorites | Main Menu
▶

Search Results for "color printer paper"

East Bay Office Supplies ☒

Filter by ⤳ 835    Clear All

Category
  Catalog items with Suppli...(1)

Item Category
  Printers and Accessories (1)

Manufacturer
  No Value (1)

Vendor
  East Bay Office Supplies (1) ⤳ 840

Category Path
  SHARE (1)

Preferred Vendor
  No (1)

1   results matched your search criteria

Item: DSS_LASER_PAPER | USA0000011 | Laser Color Printer Paper ⤳ 845
Last Updated Date: 1900-01-01
DSS_LASER_PAPER | Laser Color Printer Paper; 8 1/2" x 11"

▼ Related Actions

BUSINESS PROCESS GLOBAL SEARCHING

CROSS-REFERENCES TO RELATED APPLICATIONS

The present application claims benefit under 35 USC 119(e) of U.S. Provisional Application No. 61/707,184, filed on Sep. 28, 2012 by Demele et al. and entitled "Business Process Global Searching," of which the entire disclosure is incorporated herein by reference for all purposes.

BACKGROUND OF THE INVENTION

Embodiments of the present invention relate generally to methods and systems for searching for business objects of an enterprise application and more particularly to performing a search across business objects of different types and across one or more business processes.

Within many enterprise applications, such as an Enterprise Resource Planning (ERP) application, the primary method for navigating and locating information in the system has been done using menus and search dialogs with specific search keys. Over time searching has improved having alternate searching methods. Most recently systems are evolving to include more powerful and useful search capability to allow for unstructured searching to more quickly identify business objects such as requisitions, purchase orders, contracts, etc.

However, some deficiencies remain with these approaches. For example, embedded searches within an enterprise application previously did not provide an ability, or provided only a limited ability, to search for business objects of different types or to search for business objects across different business processes of the enterprise application. Hence, there is a need for improved methods and systems for performing a more comprehensive search across business objects of different types and/or across different business processes while still providing meaningful, targeted results.

BRIEF SUMMARY OF THE INVENTION

Embodiments of the invention provide systems and methods for performing a search across business objects of one or more business processes. According to one embodiment, performing a search across business objects of one or more business processes can comprise creating an index of business objects of a business process and supplementing the index with additional information. The additional information can indicate related business objects of different types or of different business processes. A user query can be received through a search function embedded in an enterprise application supporting the business process and a search can be performed based on the user query using the index and the supplemental information. Performing the search can comprise identifying, based on the index, business objects of the business process satisfying the user query and identifying, based on the supplemental information, objects of different types or of different business processes related to the identified business objects satisfying the user query. Results of the search including the identified business objects satisfying the user query and the identified related business objects can be presented in response to the query.

In one implementation, the supplemental information can comprise cross-reference data and supplementing the index with additional information can comprise defining the cross-reference data. The cross-reference data can link an index entry for a business object of a first type or of a first business process to one or more business objects of a second, different type or of a second, different business process. The cross-reference data can be saved in the index with the index entry. Performing the search can further comprise performing a keyword search on the index based on the user query and returning results satisfying the keyword search on the index and results identified by the cross-reference data of entries of the index satisfying the keyword search.

Additionally or alternatively, the supplemental information can comprise a set of common attributes and supplementing the index with additional information can comprise generating and saving definitions for the set of common attributes. The common attributes can comprise those attributes in common between the business objects of the business process and related business objects of different types or of different business processes. Performing the search can then further comprise performing a keyword search on the index based on the user query, identifying, based on the common attribute definitions, one or more business objects having attributes in common with business objects identified by results satisfying the keyword search, and returning the results satisfying the keyword search on the index and results identified by the common attributes definitions as having attributes in common with the results satisfying the keyword search.

Additionally or alternatively, the supplemental information can comprise a set of common facets and supplementing the index with additional information can comprise generating and saving definitions for the set of common facets. The common facets can comprise an identification of data elements in common between the business objects of the business process and related business objects of different types or of different business processes. Performing the search can then further comprise performing a keyword search on the index based on the user query, identifying, based on the common facet definitions, one or more business objects having facets in common within business objects identified by results satisfying the keyword search, and returning results satisfying the keyword search on the index and one or more indications of results identified based on the common facet definitions. In some cases, the returned results can be filtered based on one of the common facets in response to a selection of that common facet.

BRIEF DESCRIPTION OF THE DRAWINGS

FIGS. 8A-8D are a set of screenshots illustrating exemplary interfaces that may be used in performing a global search across business objects of different processes according to one embodiment of the present invention.

DETAILED DESCRIPTION OF THE INVENTION

Figure 1:
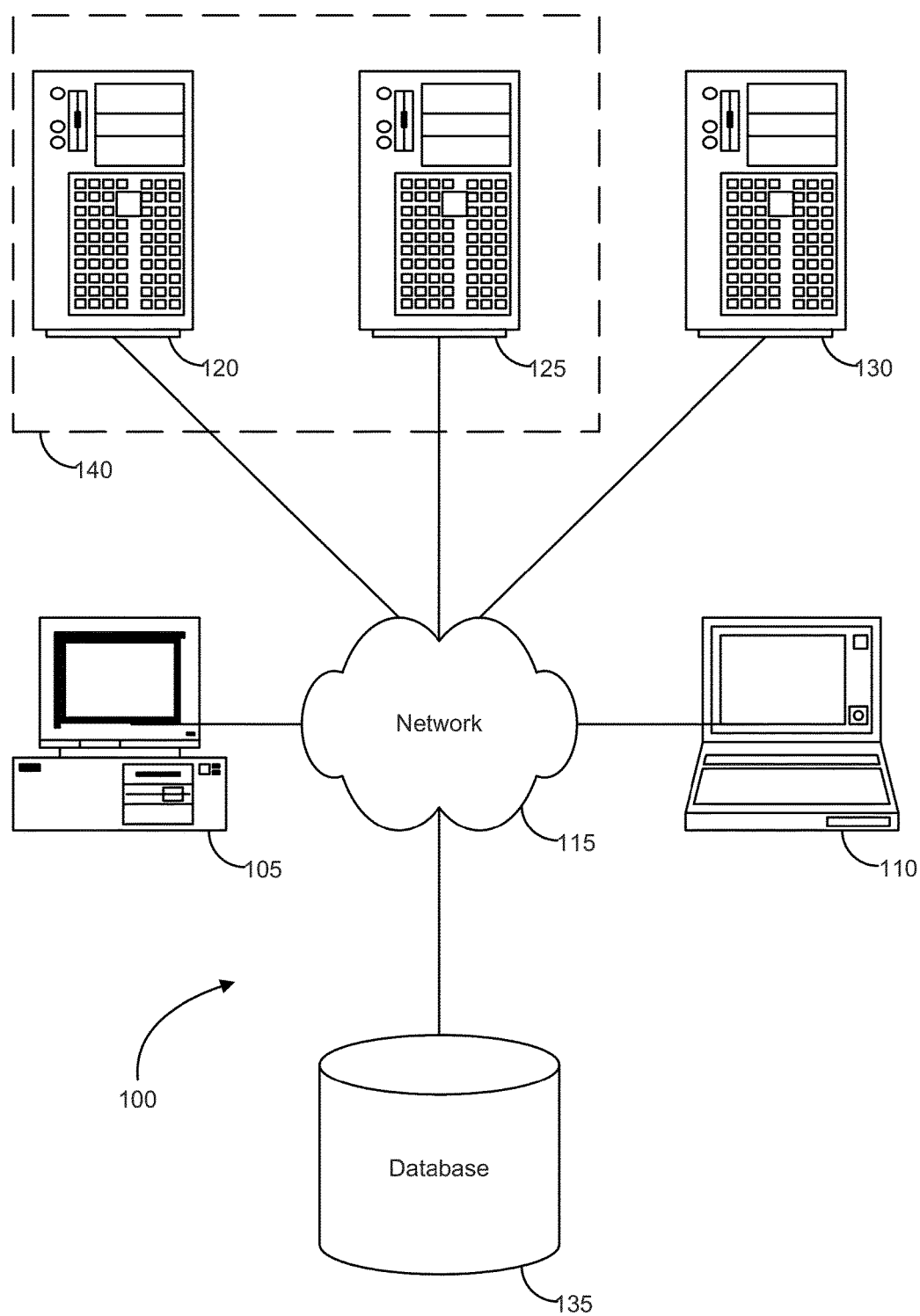
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for performing a search across business objects of one or more business processes. More specifically, embodiments of the present invention provide for performing a search across business objects of one or more business processes based on an index of business objects and additional information supplementing the index. The additional information can indicate business objects of different types or of different business processes that are related to the indexed business objects. According to various embodiments of the present invention, providing business object and business process searching can include but is not limited to: the ability to more quickly find related documents using search in one step; the ability to do so without using menus; the ability to quickly refine search results with common facets; and/or the ability to do advanced common attributes searches across business objects such as comments for a supplier across numerous business objects. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
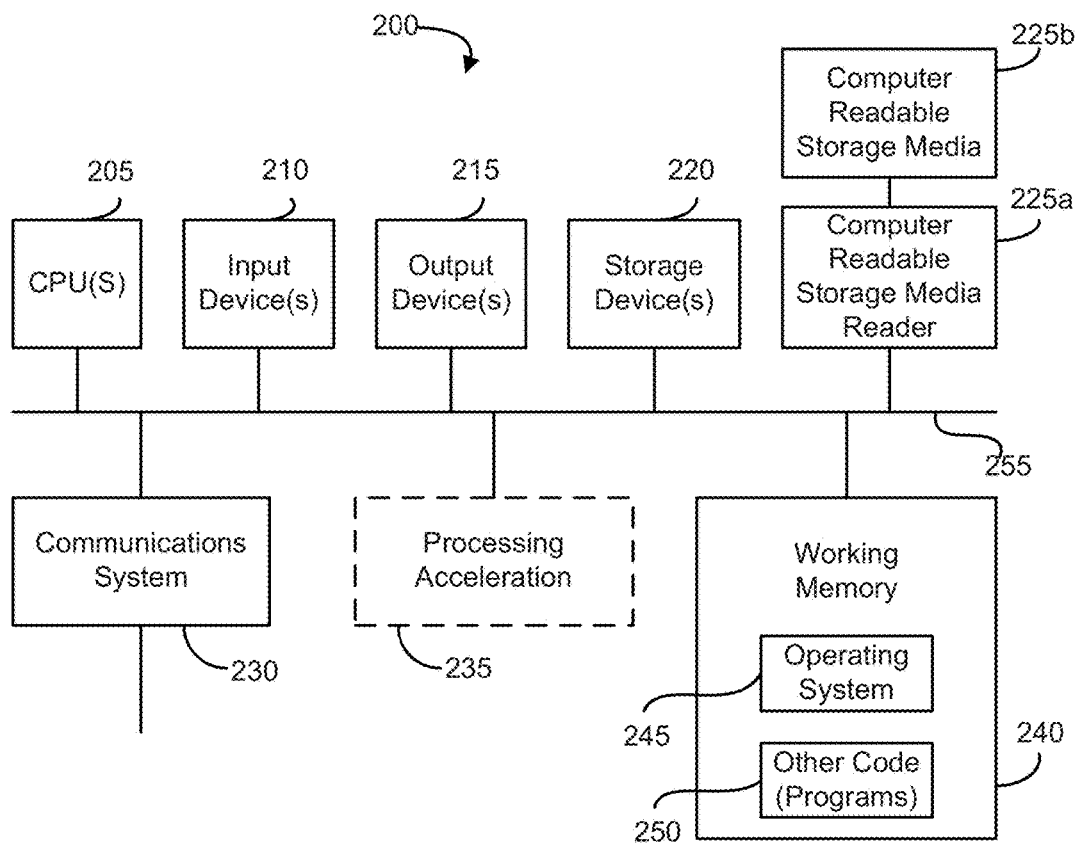
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
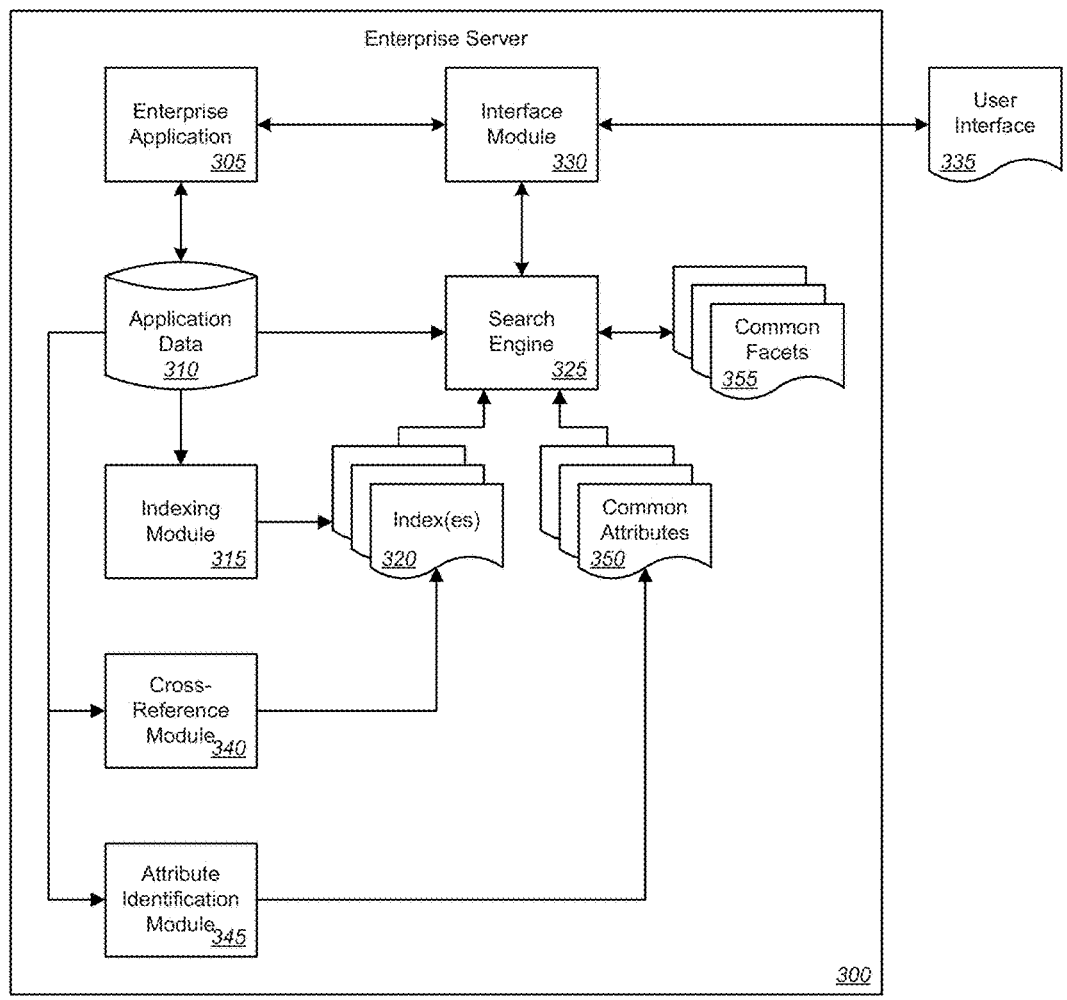
FIG. 3 is a block diagram illustrating, at a high-level, functional components of a system for performing global searching across business objects of different processes according to one embodiment of the present invention.

FIG. 3 is a block diagram illustrating, at a high-level, functional components of a system for performing global searching across business objects of different processes according to one embodiment of the present invention. As illustrated in this example, an enterprise server 300, such as any one or more of the systems described above, executing an enterprise application 305 such as an Enterprise Resource Planning (ERP) or other application. Generally speaking, the enterprise application 305 can maintain and utilize a set of application data 310 which can include any number of different types of business objects for use by various business processes executed by the enterprise application 305. For example and in the case of an ERP application, these business objects might include objects representing purchase orders, requisitions, invoices, etc. The enterprise server 330 and/or a web server (not shown here) may also include an interface module 330 for providing a user interface 335 such as a set of web pages or other interfaces to a user to allow the user to interact with the enterprise application 305.

The enterprise server can also include a search engine 325. It should be noted that, while the search engine is illustrated here as a component separate from the enterprise application 305 for the sake of clarity, in other implementations the search engine 325 may be part of or may be provided by the enterprise application 305. Generally speaking, the search engine 325, together with the interface module 330 and user interface 335, can receive and execute user queries to find and present business objects or other application data 310 of interest to a requesting user. To facilitate these searches, the enterprise server can also include an indexing module 315. Again, it should be noted that while the indexing module 315 is illustrated here as separate from the search engine 325 for the sake of clarity, in other implementations the indexing module 315 may be implemented as part of the search engine 325. Generally speaking, the indexing module 315 may prepare and maintain one or more indexes 320 comprising keys representing and linking to the application data 310 and business objects therein and which may in turn be used by the search engine 325 to improve the speed and efficiency of the searches performed.

According to one embodiment, performing a search across business objects of one or more business processes can comprise the indexing module 315 creating an index 320 of business objects in the application data 310 of a business process executed by the enterprise application 305 and supplementing the index 320 with additional information. The additional information can indicate business objects in the application data 310 or elsewhere of different types or of different business processes executed by the enterprise application 305 or other application (not shown here) that are related to the indexed business objects. A user query can be received through a search function embedded in the user interface 335 provided to the user by the enterprise application 305 through the interface module 330. A search can be performed by the search engine 325 based on the user query using the index 320 and the supplemental information. Performing the search can comprise identifying, by the search engine 325 based on the index 320, business objects in the application data 310 satisfying the user query and identifying, by the search engine 325 based on the supplemental information, business objects of different types or of different business processes related to the identified business objects satisfying the user query. The results of the search including the identified business objects satisfying the user query and the identified related business objects can be presented to the user by the search engine 325 and interface module 330 through the user interface 335 in response to the query.

More specifically, supplementing the index 320 with additional information can comprise defining by a cross-reference module 340 cross-reference data. The cross-reference data can link an index 320 entry for a business object of a first type or of a first business process to one or more business objects of a second, different type or of a second, different business process. The cross-reference data can be saved in the index 320 with the index entry. Performing the search can then further comprise performing by the search engine 325 a keyword search on the index 320 based on the user query and returning by the search engine 325 results satisfying the keyword search on the index 320 and results identified by the cross-reference data of entries of the index 320 satisfying the keyword search.

Additionally or alternatively, supplementing the index 320 with additional information can comprise generating by an attribute identification module 345 definitions for a set of common attributes 350 and saving the common attributes definitions. The common attributes 350 can comprise indications of those attributes in common between the business objects of the business process and related business objects of different types or of different business processes. Performing the search can then further comprise performing by the search engine 325 a keyword search on the index 320 based on the user query, identifying by the search engine 325 based on the common attribute definitions 350, one or more business objects in the application data 310 or elsewhere having attributes in common with business objects identified by results satisfying the keyword search, and returning by the search engine 325 the results satisfying the keyword search on the index 320 and results identified by the common attributes definitions 350 as having attributes in common with the results satisfying the keyword search.

Additionally or alternatively, supplementing the index with additional information can comprise generating by the search engine 325 or other element of the enterprise server 300 definitions for a set of common facets 355 and saving the common facet definitions 355. The common facets 355 can comprise an identification of data elements in common between the business objects of the business process and related business objects of different types or of different business processes. Performing the search can then further comprise performing by the search engine 325 a keyword search on the index 320 based on the user query, identifying by the search engine 325 based on the common facet definitions 355, one or more business objects of the application data 310 or elsewhere having facets in common within business objects identified by results satisfying the keyword search, and returning by the search engine 325 results satisfying the keyword search on the index and one or more indications of results identified based on the common facet definitions. In some cases, the returned results by the search engine 325 can be filtered based on one of the common facets 355, for example, in response to a selection of that common facet through the user interface 335 presenting the results.

According to one embodiment, using a search framework, such as Peopletools Search Framework for example, that embeds search abilities within an enterprise application 305, an administrator or other user can define for business objects in the application data 310 queries and attributes (fields) to be included in each searchable object. In addition, the user can create common facet values 355 and common search attributes 350 across business objects such that each business object 'maps' pertinent information into a common facet or attribute. Such as example a common facet of 'Document Date' should be provided from the 'Purchase Order Date' for a Purchase order, 'Requisition Create Date' for a requisition, and Receipt Date from a receipt. This allows the end user to quickly search across all these objects and filter results using facet by 'Document Date' in order to identify pertinent information by a year, month, or day (one example).

Figure 4:
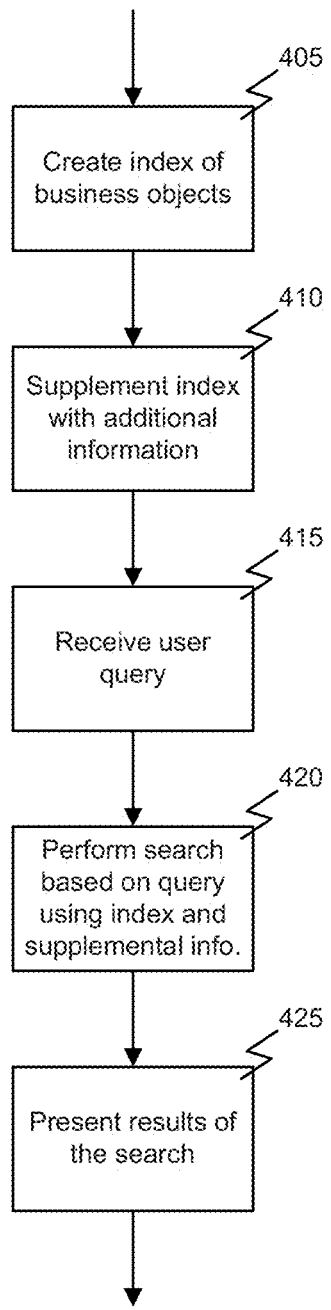
FIG. 4 is a flowchart illustrating a process for performing global searching across business objects of different processes according to one embodiment of the present invention.

FIG. 4 is a flowchart illustrating a process for performing global searching across business objects of different processes according to one embodiment of the present invention. As illustrated in this example, performing a search across business objects of one or more business processes can comprise creating 405 an index of business objects of a business process and supplementing 410 the index with additional information. The additional information can indicate business objects of different types or of different business processes that are related to the indexed business objects. A user query can be received 415 through a search function embedded in an enterprise application supporting the business process and a search can be performed 420 based on the user query using the index and the supplemental information. Performing 420 the search can comprise identifying, based on the index, business objects of the business process satisfying the user query and identifying, based on the supplemental information, business objects of different types or of different business processes related to the identified business objects satisfying the user query. The results of the search including the identified business objects satisfying the user query and the identified related business objects can be presented 425 to the user in response to the query.

Figure 5:
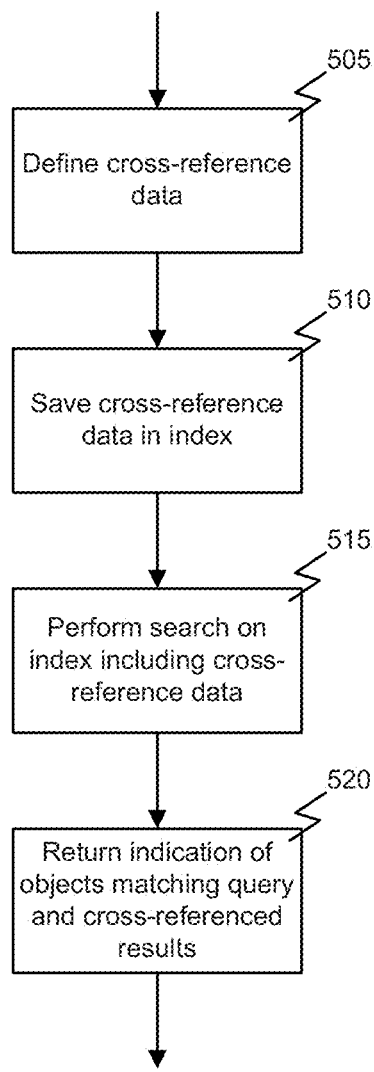
FIG. 5 is a flowchart illustrating a process for defining and using cross-reference data in a global search across business objects of different processes according to one embodiment of the present invention.

FIG. 5 is a flowchart illustrating a process for defining and using cross-reference data in a global search across business objects of different processes according to one embodiment of the present invention. As illustrated in this example, supplementing the index with additional information can comprise defining 505 the cross-reference data. The cross-reference data can link an index entry for a business object of a first type or of a first business process to one or more business objects of a second, different type or of a second, different business process. The cross-reference data can be saved 510 in the index with the index entry. Performing the search can then further comprise performing 515 a keyword search on the index based on the user query and returning 520 results satisfying the keyword search on the index and results identified by the cross-reference data of entries of the index satisfying the keyword search.

Figure 6:
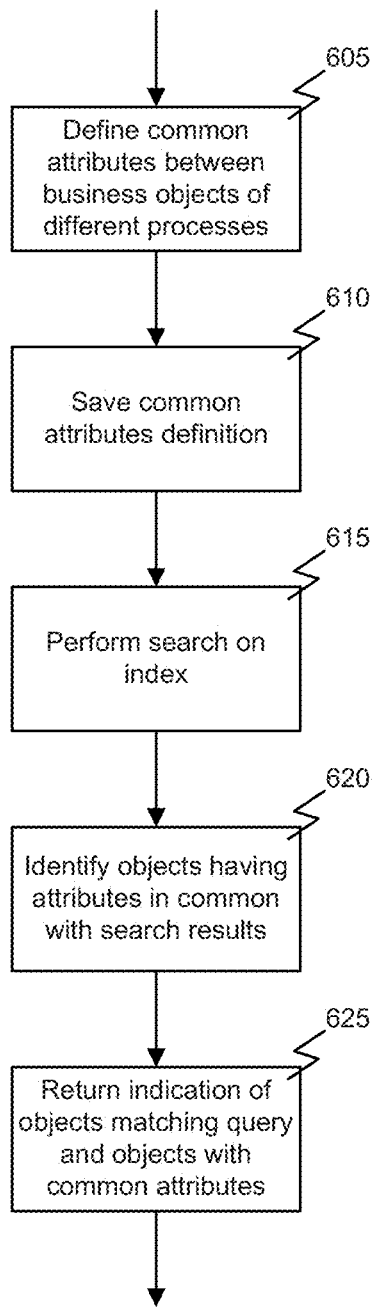
FIG. 6 is a flowchart illustrating a process for defining and using common attributes in a global search across business objects of different processes according to one embodiment of the present invention.

FIG. 6 is a flowchart illustrating a process for defining and using common attributes in a global search across business objects of different processes according to one embodiment of the present invention. As illustrated in this example, supplementing the index with additional information can comprise generating 605 definitions for the set of common attributes and saving 610 the common attributes definitions. The common attributes can comprise those attributes in common between the business objects of the business process and related business objects of different types or of different business processes. Performing the search can then further comprise performing 615 a keyword search on the index based on the user query, identifying 620, based on the common attribute definitions, one or more business objects having attributes in common with business objects identified by results satisfying the keyword search, and returning 625 the results satisfying the keyword search on the index and results identified by the common attributes definitions as having attributes in common with the results satisfying the keyword search.

Figure 7:
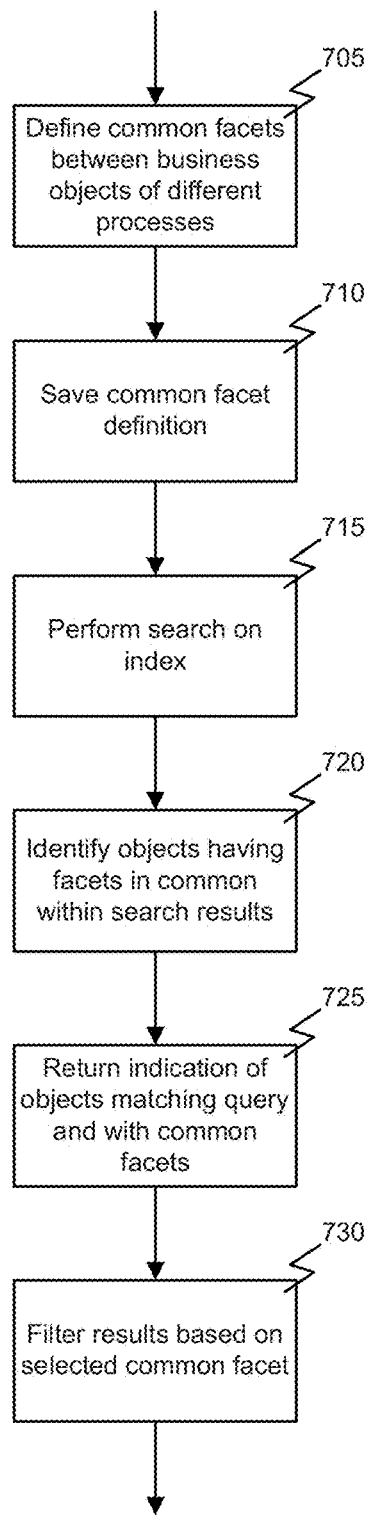
FIG. 7 is a flowchart illustrating a process for defining and using common facets in a global search across business objects of different processes according to one embodiment of the present invention.

FIG. 7 is a flowchart illustrating a process for defining and using common facets in a global search across business objects of different processes according to one embodiment of the present invention. As illustrated in this example, supplementing the index with additional information can comprise generating 705 definitions for the set of common facets and saving 710 the common facet definitions. The common facets can comprise an identification of data elements in common between the business objects of the business process and related business objects of different types or of different business processes. Performing the search can then further comprise performing 715 a keyword search on the index based on the user query, identifying 720, based on the common facet definitions, one or more business objects having facets in common within business objects identified by results satisfying the keyword search, and returning 725 results satisfying the keyword search on the index and one or more indications of results identified based on the common facet definitions. In some cases, the returned results can be filtered 730 based on one of the common facets, for example, in response to a selection of that common facet through a user interface presenting the results.

As noted above, a user interface of an enterprise application can embed or otherwise provide access to the search features described herein. To better explain the functions performed by searches described above, some exemplary user interfaces are provided in the figures and will be briefly described below. It should be understood that these exemplary interfaces are provided for illustrative purposes only and are not intended to limit the scope of the present invention. Rather, the actual format, content, and other features of the interfaces can vary widely between implementations without departing from the scope of the present invention.

Figure 8A:
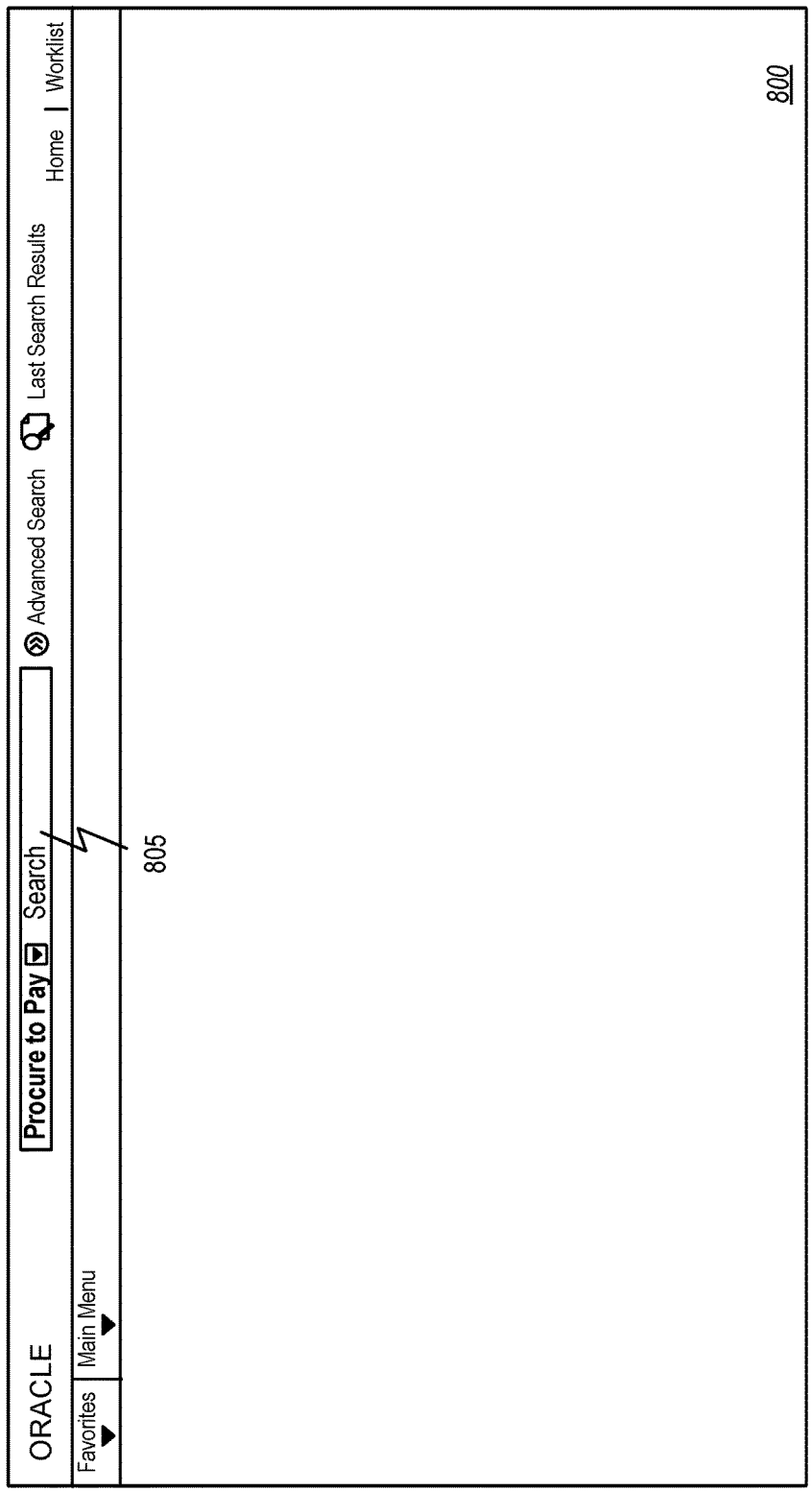
Figure 8B:
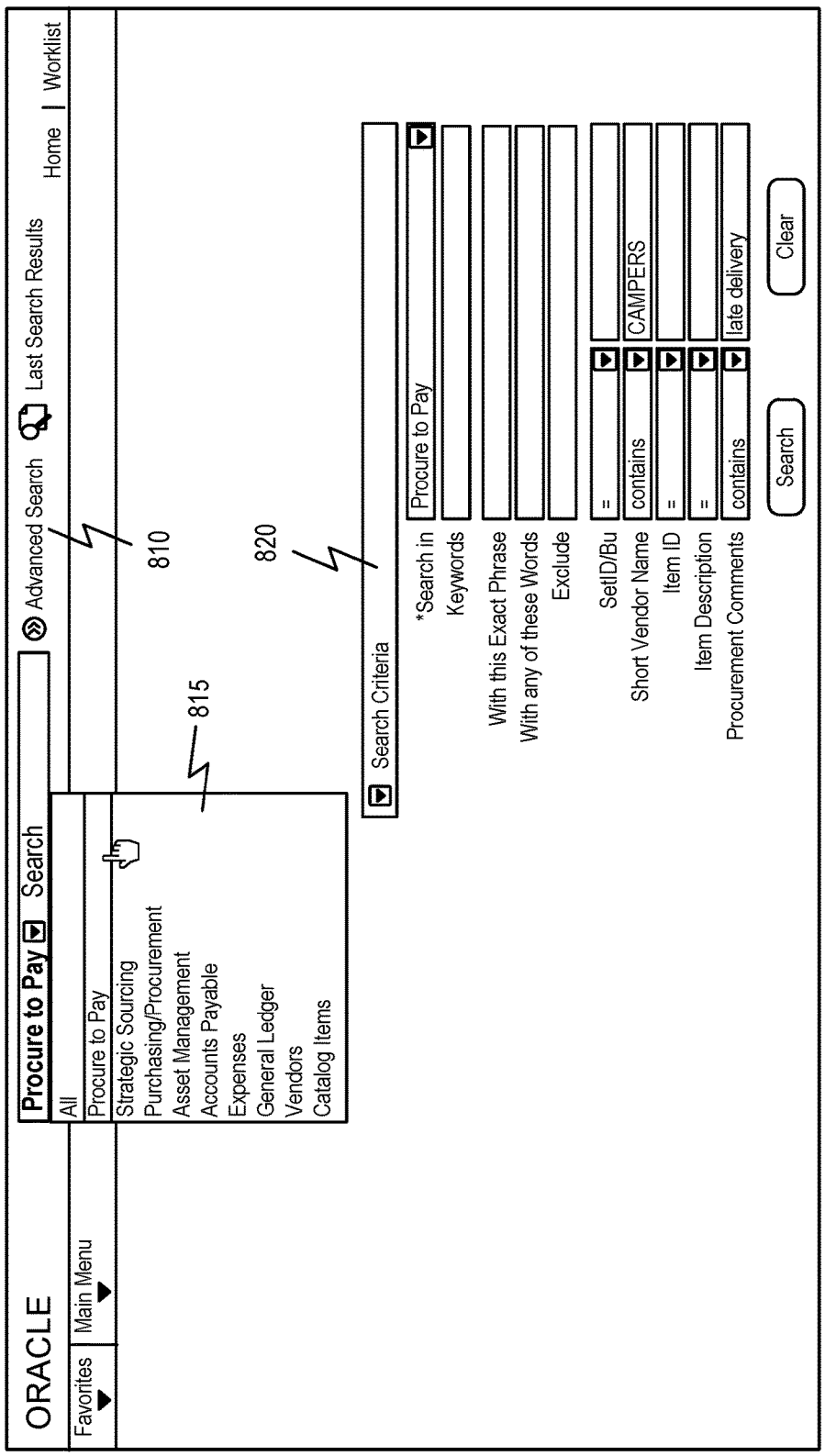

FIGS. 8A-8D are a set of screenshots illustrating exemplary interfaces that may be used in performing a global search across business objects of different processes according to one embodiment of the present invention. For example, FIG. 8A illustrates an interface page 800 including a set of search elements 805 such as a text box for entering search criteria. As illustrated in FIG. 8B, this interface 800 may be augmented, for example in response to clicking or selecting an "Advanced Search" option, to include a dialog box 820 or other additional elements for further definition or selection of search criteria. Additionally or alternatively, other elements 815, such as a drop down menu or other control, can be presented through which the user can select common or pre-defined criteria.

Once a search has been performed, the page 800 may be updated to present the results such as illustrated in FIG. 8C. As illustrated here, the results can include indications 825 and 830 of, e.g., links to, business objects identified by the search according to the functions described above. As noted above, the results may be based on common attributes and the search criteria 850. In this case, the results include indications of objects matching search criteria 850 but across objects of different types, e.g., vouchers 825, purchase orders 830, requisitions 855 etc., based on the common attributes of those objects and the search criteria. Also noted above, the search results can, in some cases, be based on and can include a set of common facets. As illustrated in FIG. 8D, a list of these facets 835 may be provided in the results and, upon a selection of one of these facets 840, the results 845 can be filtered based on the selected facet.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for performing a search across business objects of business processes, the method comprising:
    creating, by a server system, an index of business objects of a first business process;
    supplementing, by the server system, the index with supplemental information that indicates related business objects of different business processes, where the different business processes comprise a requisition process, the supplemental information comprises cross-reference data and a set of common attributes, and the supplementing the index comprises:
        defining the cross-reference data, the cross-reference data linking an index entry for a first business object of the first business process to a first set of one or more business objects so that the first set of one or more business objects corresponds to a set of one or more linked objects linked to the first business object, wherein the first set of one or more business objects is of a second business process that are different than the first business process;
        saving the cross-reference data in the index with the index entry;
        linking the index to application data maintained by an enterprise application and to the business objects therein with keys of the index, where each of the business objects has respective object fields in the application data defining respective attributes of the business object;
        generating one or more definitions for the set of common attributes, the set of common attributes comprising a subset of the object fields in common between the first business object and a second set of one or more business objects, where the second set of one or more business objects is of a third business process that are different than the first business process; and
        saving the one or more definitions for the set of common attributes;
    receiving, by the server system, search criteria through a search function embedded in the enterprise application supporting the first business process;
    performing, by the server system, a search based on the search criteria using the index and the supplemental information, at least in part by:
        identifying, based on the index, a first subset of the business objects of the first business process satisfying the search criteria, the first subset comprising the first business object;
        selecting, based on the cross-reference data in the index, a second subset of the business objects that comprises the set of one or more linked objects, where the first subset and the second subset form a first set of results; and
        identifying, based on the one or more definitions for the set of common attributes, a third subset of the related business objects of the different business processes related to the first set of results, where at least part of the first set of results and at least part of the third subset of the related business objects form a second set of results; and
    controlling, by the server system, serving of particularized content that is particularized to the second set of results, the particularized content comprising:
        first content particularized to the first business object and comprising:
            a first object identifier for the first business object;
            a first object description for the first business object;
            a first link to the first business object; and
            at least one first selectable option linked to initiate at least one first related action in at least one first process involving the first business object; and
        second content particularized to a second business object of the set of one or more linked objects and comprising:
            a second object identifier for the second business object;
            a second object description for the second business object;
            a second link to the second business object; and
            at least one second selectable option linked to initiate at least one second related action in at least one second process involving the second business object; and
        third content particularized to a third business object of the third subset of the related business objects and comprising:
            a third object identifier for the third business object;
            a third object description for the third business object;
            a third link to the third business object; and
            at least one third selectable option linked to initiate at least one third related action in at least one third process involving the third business object;
    where the serving of the particularized content causes presentation of the particularized content to indicate the second set of results; and
    where the at least one first related action, the at least one second related action, or the at least one third related action corresponds to creating a related business object with an execution of the requisition process and initiating the requisition process to create the related business object corresponding to a requisition instance at least in part by pre-loading one or more object fields of the related business object that comprise one or more respective attributes of one or more respective object fields of the first business object, the second business object, or the third business object from the linked application data.

2. The method of claim 1, wherein the performing the search further comprises:
    performing a keyword search on the index based on the search criteria; and
    returning results satisfying the keyword search on the index and results identified by the cross-reference data of entries of the index satisfying the keyword search.

3. The method of claim 1, wherein:
    the first subset is identified based on performing a keyword search on the index based on the search criteria; and
    the third subset is identified as having attributes in common with the first subset of the business objects.

4. The method of claim 1, wherein the supplemental information comprises a set of common facets, and wherein the supplementing the index with the supplemental information comprises:

generating definitions for the set of common facets, the set of common facets comprising an identification of data elements in common between one or more of the business objects of the first business process and one or more of the related business objects of the different business processes; and saving the definitions for the set of common facets.

5. The method of claim 4, wherein:

the first subset of the business objects are identified based on performing a keyword search on the index based on the search criteria;

identifying, based on the definitions for the set of common facets, one or more business objects of the second subset and the third subset having facets in common with at least one business object of the first subset; and returning one or more indications of results identified based on the definitions for the set of common facets.

6. The method of claim 5, further comprising filtering the second set of results based on one common facet of the set of common facets in response to a selection of the one common facet.

7. A system comprising:

one or more servers communicatively configured to perform a search across business objects of one or more business processes by:

creating an index of business objects of a first business process;

supplementing the index with supplemental information that indicates related business objects of different business processes, where the different business processes a requisition process, the supplemental information comprises cross-reference data and a set of common attributes, and the supplementing the index comprises:

defining the cross-reference data, the cross-reference data linking an index entry for a first business object of the first business process to a first set of one or more business objects so that the first set of one or more business objects corresponds to a set of one or more linked objects linked to the first business object, wherein the first set of one or more business objects is of a second business process that are different than the first business process;

saving the cross-reference data in the index with the index entry;

linking the index to application data maintained by an enterprise application and to the business objects therein with keys of the index, where each of the business objects has respective object fields in the application data defining respective attributes of the business object;

generating one or more definitions for the set of common attributes, the set of the common attributes comprising a subset of the object fields in common between the first business object and a second set of one or more business objects, where the second set of one or more business objects is of a third business process that are different than the first business process; and saving the one or more definitions for the set of common attributes;

receiving search criteria through a search function embedded in the enterprise application supporting the first business process;

performing a search based on the search criteria using the index and the supplemental information, at least in part by:

identifying, based on the index, a first subset of the business objects of the first business process satisfying the search criteria, the first subset comprising the first business object;

selecting, based on the cross-reference data in the index, a second subset of the business objects that comprises the set of one or more linked objects, where the first subset and the second subset form a first set of results; and identifying, based on the one or more definitions for the set of common attributes, a third subset of the related business objects of the different business processes related to the first set of results, where at least part of the first set of results and at least part of the third subset of the related business objects form a second set of results; and controlling serving of particularized content that is particularized to the second set of results, the particularized content comprising:

first content particularized to the first business object and comprising:

a first object identifier for the first business object;

a first object description for the first business object;

a first link to the first business object; and at least one first selectable option linked to initiate at least one first related action in at least one first process involving the first business object; and second content particularized to a second business object of the set of one or more linked objects and comprising:

a second object identifier for the second business object;

a second object description for the second business object;

a second link to the second business object; and at least one second selectable option linked to initiate at least one second related action in at least one second process involving the second business object; and third content particularized to a third business object of the third subset of the related business objects and comprising:

a third object identifier for the third business object;

a third object description for the third business object;

a third link to the third business object; and at least one third selectable option linked to initiate at least one third related action in at least one third process involving the third business object;

where the serving of the particularized content causes presentation of the particularized content to indicate the second set of results; and where the at least one first related action, the at least one second related action, or the at least one third related action corresponds to creating a related business object with an execution of the requisition process and initiating the requisition process to create the related business object corresponding to a requisition instance at least in part by pre-loading one or more object fields of the related business object that comprise one or more respective attributes of one or more respective object fields of the first business object, the second business object, or the third business object from the linked application data.

8. The system of claim 7, wherein the performing the search further comprises:
performing a keyword search on the index based on the search criteria; and
returning results satisfying the keyword search on the index and results identified by the cross-reference data of entries of the index satisfying the keyword search.

9. The system of claim 7, wherein:
the first subset is identified based on performing a keyword search on the index based on the search criteria; and
the third subset is identified as having attributes in common with the first subset of the business objects.

10. The system of claim 7, wherein the supplemental information comprises a set of common facets, and wherein the supplementing the index with the supplemental information comprises:
generating definitions for the set of common facets, the set of common facets comprising an identification of data elements in common between one or more of the business objects of the first business process and one or more of the related business objects of the different business processes; and
saving the definitions for the set of common facets.

11. The system of claim 10, wherein:
the first subset of the business objects are identified based on performing a keyword search on the index based on the search criteria;
identifying, based on the definitions for the set of common facets, one or more business objects of the second subset and the third subset having facets in common with at least one business object of the first subset; and
returning one or more indications of results identified based on the definitions for the set of common facets.

12. A computer-readable memory device that is non-transitory and comprises a set of instructions stored therein which, when executed by a processor, causes the processor to perform a search across business objects of one or more business processes by:
creating an index of business objects of a first business process;
supplementing the index with supplemental information that indicates related business objects of different business processes, where the different business processes comprise a requisition process, the supplemental information comprises cross-reference data and a set of common attributes, and the supplementing the index comprises:
defining the cross-reference data, the cross-reference data linking an index entry for a first business object of the first business process to a first set of one or more business objects so that the first set of one or more business objects corresponds to a set of one or more linked objects linked to the first business object, wherein the first set of one or more business objects is of a second business process that are different than the first business process;
saving the cross-reference data in the index with the index entry;
linking the index to application data maintained by an enterprise application and to the business objects therein with keys of the index, where each of the business objects has respective object fields in the application data defining respective attributes of the business object;
generating one or more definitions for the set of common attributes, the set of common attributes comprising a subset of the object fields in common between the first business object and a second set of one or more business objects, where the second set of one or more business objects is of a third business process that are different than the first business process; and
saving the one or more definitions for the set of common attributes;
receiving search criteria through a search function embedded in the enterprise application supporting the first business process;
performing a search based on the search criteria using the index and the supplemental information, at least in part by:
identifying, based on the index, a first subset of the business objects of the first business process satisfying the search criteria, the first subset comprising the first business object;
selecting, based on the cross-reference data in the index, a second subset of the business objects that comprises the set of one or more linked objects, where the first subset and the second subset form a first set of results; and
identifying, based on the one or more definitions for the set of common attributes, a third subset of the related business objects of the different business processes related to the first set of results, where at least part of the first set of results and at least part of the third subset of the related business objects form a second set of results; and
controlling serving of particularized content that is particularized to the second set of results, the particularized content comprising:
first content particularized to the first business object and comprising:
a first object identifier for the first business object;
a first object description for the first business object;
a first link to the first business object; and
at least one first selectable option linked to initiate at least one first related action in at least one first process involving the first business object; and
second content particularized to a second business object of the set of one or more linked objects and comprising:
a second object identifier for the second business object;
a second object description for the second business object;
a second link to the second business object; and
at least one second selectable option linked to initiate at least one second related action in at least one second process involving the second business object; and
third content particularized to a third business object of the third subset of the related business objects and comprising:
a third object identifier for the third business object;
a third object description for the third business object;

a third link to the third business object; and
at least one third selectable option linked to initiate at least one third related action in at least one third process involving the third business object;
where the serving of the particularized content causes presentation of the particularized content to indicate the second set of results; and
where the at least one first related action, the at least one second related action, or the at least one third related action corresponds to creating a related business object with an execution of the requisition process and initiating the requisition process to create the related business object corresponding to a requisition instance at least in part by pre-loading one or more object fields of the related business object that comprise one or more respective attributes of one or more respective object fields of the first business object, the second business object, or the third business object from the linked application data.

13. The computer-readable memory device of claim 12, wherein the performing the search further-comprises:
performing a keyword search on the index based on the search criteria; and
returning results satisfying the keyword search on the index and results identified by the cross-reference data of entries of the index satisfying the keyword search.

14. The computer-readable memory device of claim 12, wherein the first subset is identified based on performing a keyword search on the index based on the search criteria, and the third subset is identified as having attributes in common with the first subset of the business objects.

15. The computer-readable memory device of claim 12, wherein the supplemental information comprises a set of common facets, and wherein the supplementing the index with supplemental information comprises:
generating definitions for the set of common facets, the set of common facets comprising an identification of data elements in common between one or more of the business objects of the first business process and one or more of the related business objects of the different business processes; and
saving the definitions for the set of common facets, and wherein:
the first subset of the business objects are identified based on performing a keyword search on the index based on the search criteria;
identifying, based on the definitions for the set of common facets, one or more business objects of the second subset and the third subset having facets in common with at least one business object of the first subset; and
returning one or more indications of results identified based on the definitions for the set of common facets.

\* \* \* \* \*